INVENTOR.
Peter A. Rahaim
BY Charles R. Fay,
Attorney

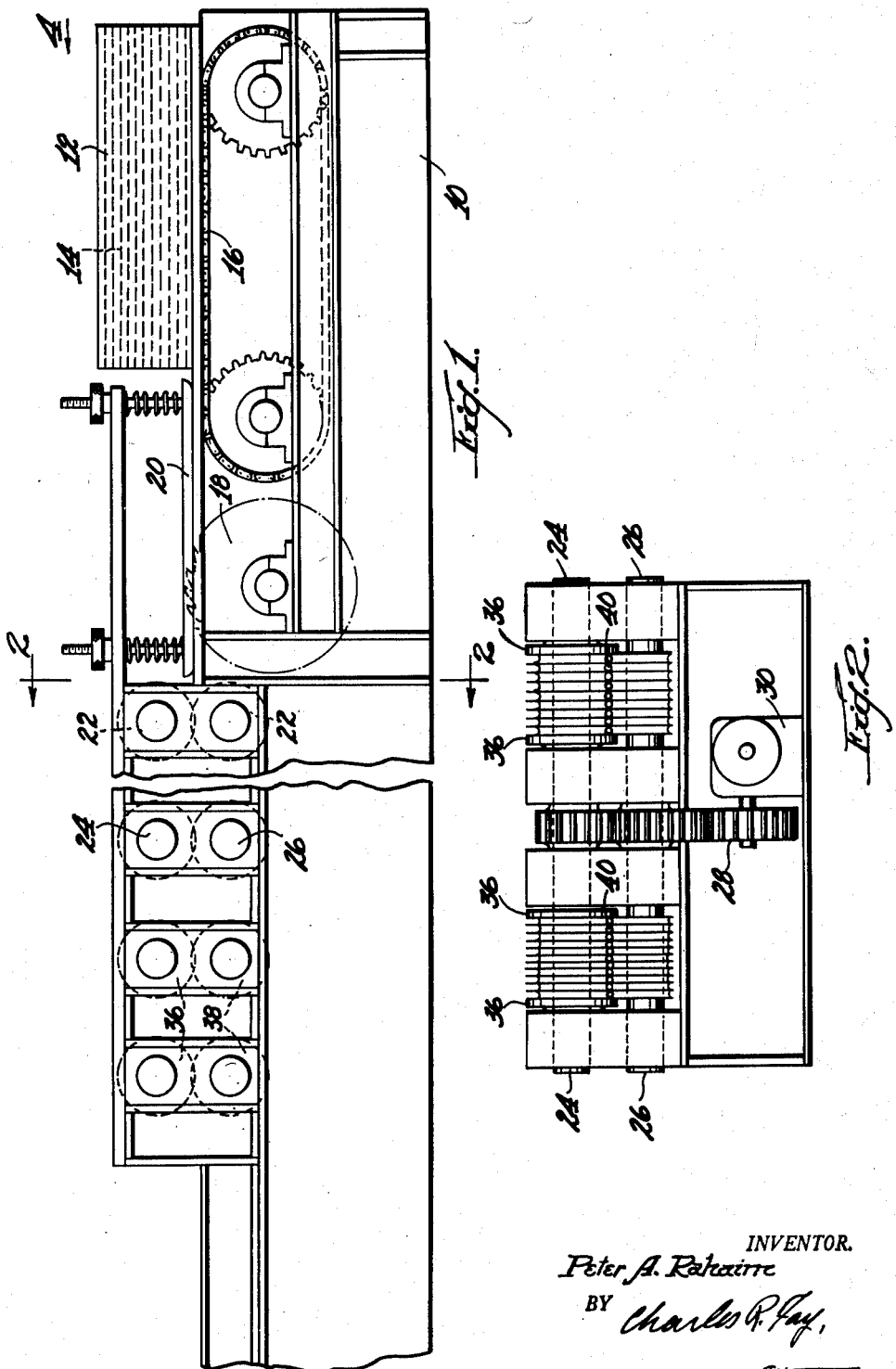

Patented Mar. 3, 1953

2,630,149

UNITED STATES PATENT OFFICE 2,630,149

APPARATUS FOR THE MANUFACTURE OF COMPRESSED WOODEN DOWELS

Peter A. Rahaim, Gardner, Mass.

Application October 17, 1947, Serial No. 780,526

2 Claims. (Cl. 144—49)

This application relates to a machine for forming dowels and dowel stock according to my copending application Serial No. 767,886, filed August 11, 1947, wherein the advantages of compressed wooden dowels are clearly recited. Although the dowels may be compressed in the present machine from round stock, this invention discloses the apparatus as particularly adapted to compressing the dowels from stock having rectangular section.

The principal object of the invention resides in the provision of a machine for the fast, high-speed production of compressed dowel stock and comprises a hopper from which is fed material of rectangular cross-section to gang saws for cutting the rectangular section stock into stock of square section in combination with a plurality of compressing rolls into which the square stock is introduced and through which it is fed by the action of the rolls which are driven and which compress the stock to a circular or other section.

Other objects and advantages of the invention will appear hereinafter.

Reference is to be had to the accompanying drawing in which

Fig. 1 is a view in side elevation of the machine, parts being broken away;

Fig. 2 is a section on line 2—2 of Fig. 1;

Figure 3:
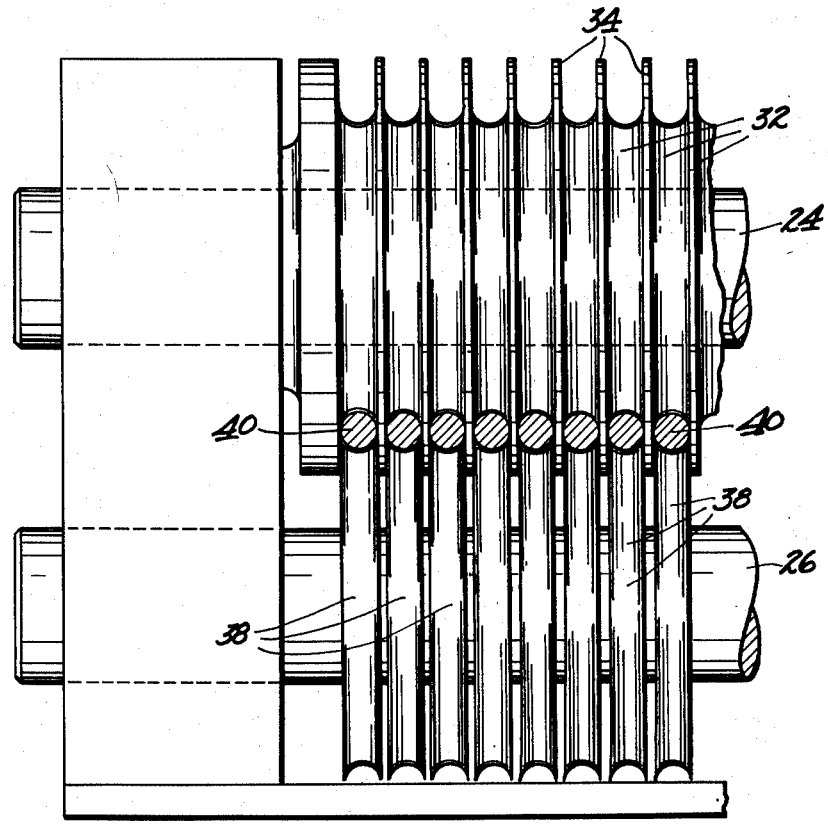
Fig. 3 is an enlarged view in front elevation showing the construction of the compressing rolls.

As illustrated in the drawings the machine comprises a base 10 of any desired or convenient construction having a hopper generally indicated at 12 to receive a plurality of superimposed boards or the like 14. The bottommost board is fed out by any convenient means such as a chain 16 toward a gang saw 18 which has a holddown device 20. As the boards are ripped into square section they are individually introduced into a pair of superposed compression rollers 22 which perform the initial compressing step and from there the stock is fed by the rollers themselves through a plurality of sets of rollers to any desired number according to circumstances. It has been found that under usual circumstances eight to twelve sets of compression rollers is sufficient to form the square stock into a highly compressed round or other shape stock, the rollers gradually compressing the stock from roller pair to roller pair. Each successive roller pair has a roller nip slightly smaller than the preceding nip.

Each roller is mounted on a heavy shaft 24 or 26 centrally driven by gears 28 from a motor 30. It will be seen in Fig. 2 that the machine is double ended with the power being taken off in the middle and that the capacity of the machine is thereby doubled, there being a gang saw for each set of compression rollers and a hopper for each gang saw.

The rollers themselves are illustrated in Fig. 3. All of the upper rolls mounted on shafts 24 comprise circular members 32 each having a concave periphery, these rolls being separated by washers or the like 34 having diameters greater than those of the members 32. The members 32 and 34 may be held together in closely assembled relation by any desired means but as shown in Fig. 2 the end washers 36 are extremely heavy and may be secured to the shaft 24 if desired or the entire assembly may be secured as by end nuts or other kinds of clamps.

The pressure rolls on the lower shafts 26 comprise members 38 exactly like the members 32 and the peripheries thereof extend upwardly between the washers 34 as clearly shown in Fig. 3. The members 38 on shaft 26 are not spaced by washers because washers 34 accomplish this purpose but, of course, if it were desired to do so washers could be used on the lower shaft in between each member 38, such washers, however, having diameters less than the pressure members 38. It has been found that there is no particular need to assemble the members 38 to shaft 26 in any way except by keying them so that the members 38 will rotate with the shaft. Of course, the members 32 and washers 34 are also keyed to shaft 24.

Due to the construction just above recited it will be seen that the operative pressure areas of the lower rollers 38 extend upwardly between the lowermost points of washers 34 and are held thereby against axial movement along the shafts. The main purpose of this construction, however, is to provide side walls for the work indicated at 40 so as to prevent sidewise breaking out of the fibers of the wood as the rolls 32 and 38 compress the same so that the finished product is smooth and accurately circular in section with no broken out fibers, so that all the fibers are compressed but none are broken.

Figure 4:
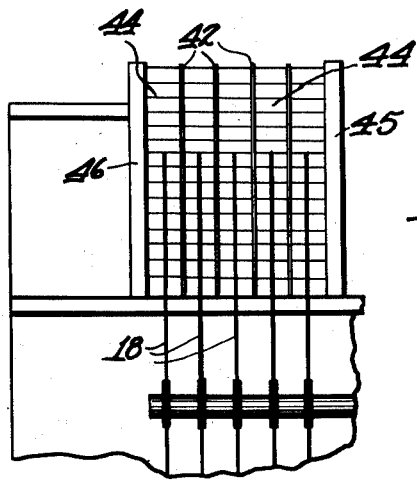
Fig. 4 is a view illustrating the hopper looking in the direction of arrow 4 in Fig. 1.

Fig. 4 illustrates the hopper which in this case comprises a series of vertical members at 42 separating vertical columns of rectangular section boards 44, these boards each being centrally divided by the gang saws 18 as they issue from the hopper as above described. Of course, it is possible to increase the number of saws and produce the required number of square section stock from boards which would extend from side to side of the hopper, that is, from side 45 to side 46, but it is preferred to form the square section stock for high speed production as herein described.

Having thus described my invention and the advantages thereof, I do not wish to be limited to the details herein disclosed otherwise than as set forth in the claims, but what I claim is:

1. Wooden dowel stock compression rollers comprising a pair of shafts one above the other, a series of concave peripheral surfaced rollers on each shaft, and substantially circular means between the rollers of one shaft, the said circular means having a diameter greater than that of the rollers and overlapping the latter on the other shaft.

2. Wooden dowel stock compression rollers comprising a pair of shafts one above the other, a series of concave peripheral surfaced rollers on each shaft, and disk-like devices between the rollers of one shaft, the said devices each having a diameter greater than that of the rollers, and extending at the peripheries thereof between the rollers on the other shaft.

PETER A. RAHAIM.

REFERENCES CITED

The following references are of record in the file of this patent:

UNITED STATES PATENTS

| Number | Name | Date |
|---|---|---|
| 1,867 | Winans | Nov. 26, 1840 |
| 172,435 | Higgins | Jan. 18, 1876 |
| 323,125 | Eagan | July 28, 1885 |
| 664,306 | Wilson | Dec. 18, 1900 |
| 706,994 | Nightman | Aug. 12, 1902 |
| 885,508 | McKee | Apr. 21, 1908 |
| 896,209 | Hutchinson | Aug. 18, 1908 |
| 907,979 | Emens et al. | Dec. 29, 1908 |
| 1,136,373 | Shedlock | Apr. 20, 1915 |
| 1,567,961 | Lauren | Dec. 29, 1925 |
| 1,687,207 | Hawker | Oct. 9, 1928 |
| 1,728,508 | Rahe | Sept. 17, 1929 |
| 1,739,516 | Neklutin | Dec. 17, 1929 |
| 1,751,320 | Genest | Mar. 18, 1930 |
| 1,825,041 | Babare | Sept. 29, 1931 |
| 2,074,713 | Tross | Mar. 23, 1937 |
| 2,283,331 | Lawton | May 19, 1942 |
| 2,412,523 | Lundstrom | Dec. 10, 1946 |